July 10, 1956 B. E. GETZ 2,753,788
PRESSURE ROLLS FOR AGRICULTURAL MACHINES
Filed Oct. 1, 1953 2 Sheets-Sheet 1
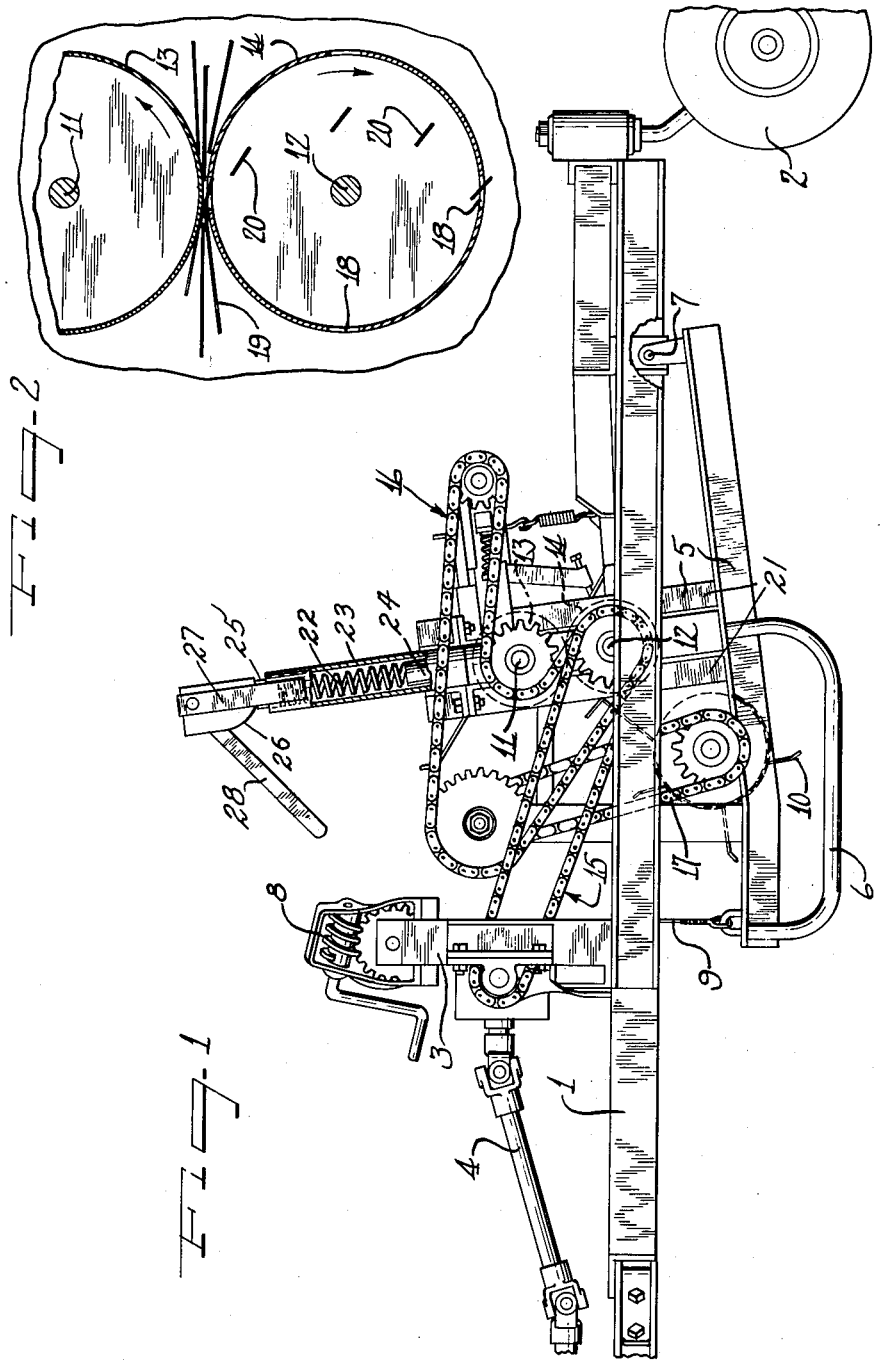
Inventor
Benjamin E. Getz
Hill, Sherman, Meroni, Gross & Simpson
Attys July 10, 1956 B. E. GETZ 2,753,788
PRESSURE ROLLS FOR AGRICULTURAL MACHINES
Filed Oct. 1, 1953 2 Sheets-Sheet 2
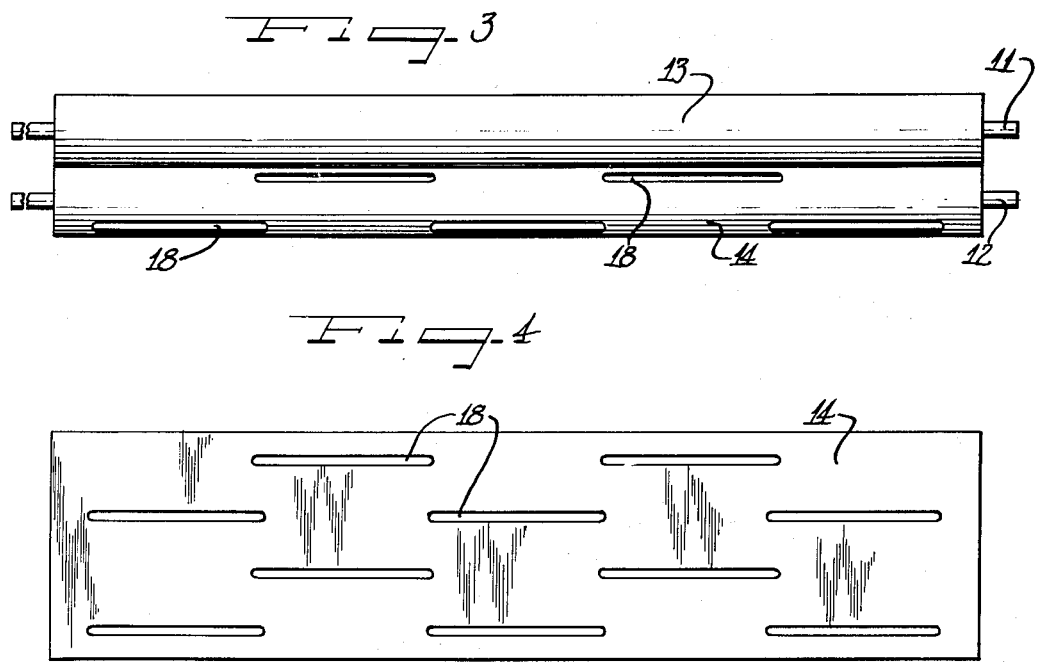
Inventor
Benjamin E. Getz
Hill, Sherman, Meroni, Gross & Simpson
Attys

United States Patent Office 2,753,788
Patented July 10, 1956

2,753,788
PRESSURE ROLLS FOR AGRICULTURAL MACHINES

Benjamin E. Getz, Morton, Ill., assignor to A. F. Meyer Mfg. Co., Morton, Ill., a corporation of Illinois Application October 1, 1953, Serial No. 383,530

3 Claims. (Cl. 100—171)

This invention relates to pressure rolls for agricultural machines, and more particularly to pressure rolls highly suitable for use in machines for processing crops such as hay and which gather the mowed crop from the ground, crush the same between a pair of rolls, and then redistribute the crushed crop upon the ground for drying purposes, although the rolls may be utilized in other agricultural machines, as will be apparent to one skilled in the art.

One form of agricultural cutting and processing machine in which the instant invention may satisfactorily be embodied is set forth, described and claimed in my Patent No. 2,592,269, issued April 8, 1952. The machine in the patent, however, discloses smooth surfaced rolls.

In machines of this character, the rolls act in the nature of wringer rolls to crush the crop, especially the stalk thereof, with the leafy portions remaining upon the stalks, and thus enhance the uniform drying of the crop and materially lessening the drying time. This also preserves the desirable components of the crop and further provides substantially uniform color.

While smooth surfaced rolls are quite satisfactory for most crops of the hay variety, foreign objects such as tough thistle and tree branches, sometimes interfere with proper crushing and distribution of the crop. Similarly, certain particular crops are difficult to handle or process in this manner. For example, cow-peas, used for hay in the South, have caused trouble. The cow-pea stalk is roughly one-quarter inch in diameter, and when the surface covering is disrupted the stalk is extremely slippery. Of course if cow-pea stalks and foreign objects as above mentioned meet the rolls with the axis of the stalk substantially perpendicular to the bight of the rolls, satisfactory crushing results. But if such a stalk meets the roll on the slant, the stalk turns sidewise, the rolls may slip upon it after the surface covering is disrupted, and there is a pile up ahead of the rolls resulting in unsatisfactory crushing and distribution of the crop.

Certain attempts have been made to offset these adverse conditions with the use of grooved or corrugated rolls, but such attempts have proven entirely unsatisfactory. Any form of groove, corrugation, or slot, that has a bottom merely fills up in a short time and the rolls function the same as smooth surfaced rolls. Brushes and other cleaning devices have proven utterly ineffective for removing accumulations in bottomed grooves or slots or corrugations in the rolls. In fact, such accumulations become very hard and it is extremely difficult to remove them by hand with the machine stopped. In short, corrugated or grooved rolls function as desired for an extremely short period of time, and thereafter are subject to clogging and piling up of crop ahead of the rolls, to an even greater extent than initially smooth surfaced rolls.

The instant invention has been designed to provide the desired or hoped for result from corrugated or grooved rolls, without any of the disadvantages to which such rolls were subject, and with satisfactory continuous operation for an indefinite period of time.

Another object of the invention resides in the provision of rolls for agricultural processing machines so arranged as to operate smoothly, indefinitely, and satisfactorily, without clogging or piling up of material, regardless of the crop being processed, and regardless of the unexpected foreign substances that might naturally be distributed in that crop.

It is also an object of the invention to provide a roll assembly for a crop crushing machine that is so arranged to effect a tight grip upon the crop stalks, pull the stalks through the bight of the rolls regardless of the angular disposition of the stalk relatively to the bight of the rolls, and effectively crush and split the stalks in a continuous and even manner without clogging.

Another feature of the invention resides in the provision of a crushing roll assembly for agricultural processing machines, which crushing rolls are so arranged as to effect a kinking of the crop passing therebetween and so establish a firm grip on the crop sufficient to carry the same between the rolls and effect satisfactory crushing and splitting of the crop stalks.

It is also a feature of the invention to provide crushing rolls for agricultural processing machines, wherein one or both of the rolls may be hollow, and the hollow roll is provided with open slots therein, the edges of which slots effect a biting or gripping action upon the crop passing between the rolls, and the slots do not clog because they have no bottom.

Still another object of the invention resides in the provision of a pair of crushing rolls for agricultural processing machines, in which one or both rolls is hollow and is provided with slots in the circumferential portion, the slots extending parallel to the axis of the roll, and the arrangement being such that should any pieces of crop enter inside the slotted roll, those pieces are automatically removed from the roll and discharged upon the ground during continued operation of the machine.

Still a further object of the invention resides in the provision of a set of crushing rolls for use in agricultural processing machines, which rolls are so arranged as to be in effect self-cleaning.

It is also an object of the invention to provide a set of crushing rolls for agricultural processing machines, which rolls are so constructed as to effect better crushing of a crop than rolls heretofore utilized for similar purposes.

While some of the more salient features, characteristics and advantages of the instant invention have been above pointed out, others will become apparent from the following disclosures, taken in conjunction with the accompanying drawings, in which—

Figure 1 is a fragmentary side elevational view of a crop crushing and processing machine in which the instant invention may well be embodied;

Figure 2 is an enlarged fragmentary vertical sectional view illustrating the construction and operation of the rolls themselves;

Figure 3 is a side elevational view of the rolls of Fig. 2; and

Figure 4 is a development of the lower roll of Fig. 3 to illustrate the disposition of the slots or openings therein.

As shown on the drawings:

In Fig. 1, an illustrated embodiment of the instant invention is shown embodied in an agricultural processing machine of the character set forth and described in my aforesaid Patent No. 2,592,269. This machine is designed to pick up a mowed crop of the character of hay, crush the same, and distribute it lightly and evenly upon the ground for drying.

The machine embodies a main frame 1 which may be supported at its forward end, the left end as viewed in this figure, by a tractor or other power vehicle, and which may be supported at the rear end or in an intermediate location by one or more wheels 2. The main frame has an upstanding portion 3 which carries suitable gearing actuated by a shaft arrangement 4 which may be connected to the power takeoff of the pulling vehicle.

A subframe 5 provided in its forward portion with a pair of ground skids 6, is pivotally connected to the frame 1 as indicated at 7. The subframe may be elevated and lowered as desired by means of a manually operable mechanism 8 through a suspension cable 9. Mounted in the lower portion of the subframe is a crop pickup assembly, comprising in the main a rotary rake 10, and this assembly is of the same character as set forth in George Innes' U. S. Letters Patent No. 2,133,143, issued October 11, 1938, although other satisfactory pickup means might be substituted for those illustrated. Journaled in the subframe above and to the rear of the pickup means 10 is a pair of superposed shafts 11 and 12 carrying crushing rolls 13 and 14 embodying principles of the instant invention. These crushing rolls are rotated in opposite directions at the same or at a slightly different speed by suitable chain and sprocket assemblies generally indicated by numerals 15 and 16 from the gearing carried on the main frame. The sprocket assembly 16 also actuates the pickup means 10 through a chain drive 17.

As the machine moves down the field, mowed crop is picked up off the ground by the pickup means 10, and delivered upwardly between the bight of the crushing rolls 13 and 14. The crop is crushed and the stalks thereof split as it passes through the rolls 13 and 14, and is then redistributed upon the ground for drying.

Now with reference to Figs. 3 and 4, it will be seen that the rolls 13 and 14 are especially adapted to firmly grip and hold the crop, regardless of the angular disposition of the stalks to the bight of the rolls. In this instance, the upper roll 13 has a solid cylindrical surface, and the roll may be solid or hollow as desired. The lower roll 14 is hollow, and the cylinder thereof is provided with a number of openings or slots 18.

As shown in the development of Fig. 4, the slots are preferably arranged in staggered relationship and disposed in evenly spaced longitudinal rows. In the illustrated instance, there are four such rows and the rows are spaced 90° apart around the roll. There would be two diametrically opposed rows of three slots each, and two diametrically opposed rows of two slots each, the slots being preferably of such length that those of one row overlie the edges of those in the next row in a circumferential direction, as clearly seen in Fig. 4. The slots preferably have straight side edges so as to provide relatively sharp external edges defining the slots and affording positive gripping action upon the crop.

Now with reference to Fig. 2, it will be seen that with the rolls rotating in the direction indicated by the arrows, crop stalks 19 are fed to the bight of the rolls by the aforesaid pickup means 10. The relatively sharp edges of each slot 18, the trailing edge perhaps more than the leading edge, bite into the fed crop 19, kink the crop stalks, and forcibly pull the stalks between the bite of the rolls where the stalk is effectively crushed and split. It makes no difference as to the angular disposition of the stalk of foreign substance, it nevertheless must pass between the rolls and be crushed. There is no opportunity for any of the crop to pile up in front of the roll bight and accumulate into an unsatisfactory mass. Everything fed to the bight of the rolls passes therethrough. Now should portions of the stalk be cut off by the edges of the slots or openings 18, pieces such as indicated at 20, may enter inside the roll, but such pieces are promptly discharged through one or the other of the slots as the roll travels by virtue of centrifugal force, and these pieces will not remain inside the roll. One satisfactory operating speed for the rolls is approximately 400 R. P. M., and such speed is amply sufficient to provide enough centrifugal force to insure the expulsion of any particles that may enter inside the roll.

It will further be noted that it is a relatively economical expedient to provide the roll 14 with the slots 18, and since these slots have no bottoms, they do not become plugged or clogged.

Thus, it will be seen that the instant invention provides a better crushing of the stalks or crop, by virtue of the kinking, than rolls of this character utilized heretofore, and a long stalk may be contacted by several slots so that it is gripped or kinked in different places. Further, the rolls are in effect self-cleansing, and everything fed to the rolls, including foreign elements, must pass through the rolls and be distributed back upon the ground. The rolls effectively handle any character of crop of the hay-like varieties, require no attention, and function efficiently throughout indefinite periods of time. After a processing operation is completed, there is nothing noticeable left inside the slotted roll to be manually removed.

As more specifically shown and described in my aforesaid Patent No. 2,592,269, a pair of upright supports 21—21 on each side of the machine provide channels in which the bearings for the upper roll 13 may move up and down. This upper roll is biased at each end toward the lower roll by a compression spring 22 contained in a cylinder 23 carried on the respective members 21—21. At its lower end, each spring engages a plunger 24 which bears against the respective roll bearing. The other end of each spring is secured to a plunger-type rider 25 bearing against a cam 26 pivoted between a pair of supports 27. The cam is moved to pressure establishing and release positions by means of a hand lever 28.

Obviously, more or less slots may be provided as deemed most expedient under certain circumstances, but the illustrated structure herein provides satisfactory operation.

It will be understood that modifications and variations may be effected without departing from the scope of the novel concepts of the present invention.

I claim as my invention:

1. A pressure roll assembly for an agricultural machine designed to pick up a mowed crop of the character of hay, crush the same and distribute it upon the ground, which assembly includes a pair of superposed smooth surfaced crushing rolls yieldably positioned for direct contact with each other, at least one of said rolls being hollow and provided with axially spaced elongated bottomless openings therein, said openings having their long axes extending axially of the rolls, there being a plurality of circumferentially spaced and longitudinally extending rows of said openings in said one roll whereby crop pieces entering said one roll through an opening adjacent the nip of the rolls will be discharged from the interior of said one roll through an opening by centrifugal force, and said openings being arranged in overlapping staggered relationship in adjacent rows so that any circumferential line around said one roll must pass through at least one of said openings.

2. The structure of claim 1, in which said openings are defined by substantially sharp edges for biting engagement with the crop passing between the rolls.

3. The structure of claim 1, in which the roll having the openings is the lower roll, and the upper roll being imperforate.

References Cited in the file of this patent

UNITED STATES PATENTS

| | | |
|---|---|---|
| 579,335 | Banister | Mar. 23, 1897 |
| 681,645 | Pope | Aug. 27, 1901 |
| 1,238,289 | Hare | Aug. 28, 1917 |
| 1,309,015 | Buchanan | July 8, 1919 |
| 2,592,269 | Getz | Apr. 8, 1952 |
| 2,689,441 | Rosenthal | Sept. 21, 1954 |

FOREIGN PATENTS

| | | |
|---|---|---|
| 303,649 | Great Britain | Jan. 10, 1929 |
| 570,116 | France | Jan. 12, 1924 |
| 876,053 | France | July 20, 1942 |